United States Patent
Ooba (10) Patent No.: US 10,549,422 B2
(45) Date of Patent: Feb. 4, 2020

(54) ROBOT CONTROLLER, MACHINE LEARNING DEVICE AND MACHINE LEARNING METHOD

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/936,490

(22) Filed: Mar. 27, 2018

(65) Prior Publication Data

US 2018/0281181 A1 Oct. 4, 2018

(30) Foreign Application Priority Data

Mar. 31, 2017 (JP) .................... 2017-071890

(51) Int. Cl.
*B25J 9/16* (2006.01)

(52) U.S. Cl.
CPC ............ *B25J 9/163* (2013.01); *B25J 9/1669* (2013.01); *B25J 9/1687* (2013.01); *Y10S 901/02* (2013.01)

(58) Field of Classification Search
CPC ....................................................... B25J 9/163
See application file for complete search history.

(56) References Cited

U.S. PATENT DOCUMENTS

| | | | |
|---|---|---|---|
| 5,041,907 A | 8/1991 | Sager et al. | |
| 5,727,132 A | 3/1998 | Arimatsu et al. | |
| 2005/0071048 A1* | 3/2005 | Watanabe | B25J 9/1664 700/259 |
| 2016/0083198 A1 | 3/2016 | Nishizaka et al. | |
| 2017/0028499 A1* | 2/2017 | Yoshida | B23K 9/0956 |

FOREIGN PATENT DOCUMENTS

| | | | | |
|---|---|---|---|---|
| CN | 105437248 A | 3/2016 | | |
| JP | H6-238584 A | 8/1994 | | |
| JP | 8-63214 A | 3/1996 | | |
| JP | 2001-179664 A | 7/2001 | | |
| JP | 2002-274641 A | 9/2002 | | |
| JP | 2009-297881 A | 12/2009 | | |
| JP | 2009297881 A | * 12/2009 | ............. | B25J 13/08 |
| JP | 2011-140084 A | 7/2011 | | |
| JP | 2013-52490 A | 3/2013 | | |
| JP | 2013052490 A | * 3/2013 | ............. | B25J 13/08 |
| JP | 2017-30135 A | 2/2017 | | |
| JP | 2017030135 A | * 2/2017 | ............. | B25J 13/08 |

OTHER PUBLICATIONS

Office Action in JP Application No. 2017-071890, dated Nov. 20, 2018, 9pp.

* cited by examiner

*Primary Examiner* — Thomas Randazzo
(74) *Attorney, Agent, or Firm* — Hauptman Ham, LLP (57) ABSTRACT

A controller is provided with a machine learning device learning an operation start condition for storing motions for an article on the carrier device by means of the robot. The machine learning device observes operation start condition data showing the operation start condition and conveyance state data showing states of articles on the carrier device, as state variables indicating a current state of an environment. Further, the machine learning device acquires judgment data showing an appropriateness judgment result of the storing motion and learns the operation start condition in association with the conveyance state data, using the observed state variables and the acquired judgment data.

9 Claims, 8 Drawing Sheets

FIG.9

ROBOT CONTROLLER, MACHINE LEARNING DEVICE AND MACHINE LEARNING METHOD

RELATED APPLICATIONS

The present application claims priority to Japanese Patent Application No. 2017-071890 filed on Mar. 31, 2017, the disclosure of which is hereby incorporated by reference herein in its entirety.

BACKGROUND OF THE INVENTION

Field of the Invention

The present invention relates to a robot controller and a machine learning device, and in particular to a controller, a machine learning device and a machine learning method for learning an optimal robot operation start condition.

Description of the Related Art

Figure 9:
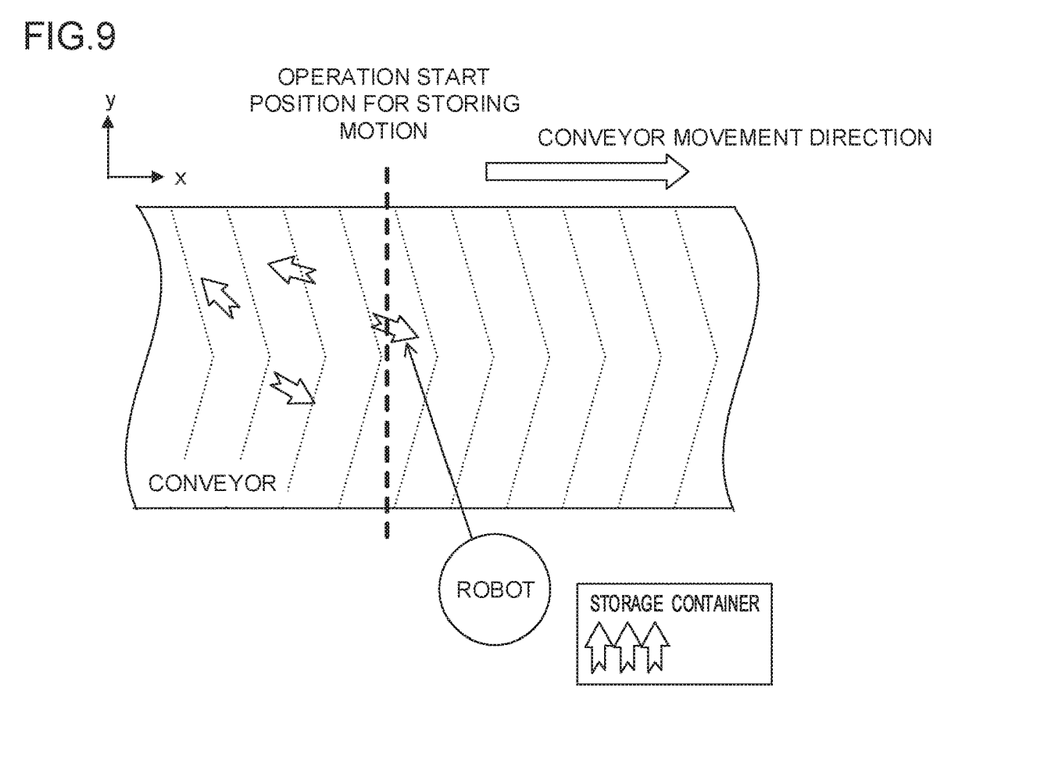
FIG. 9 is a diagram illustrating an operation of an article carrier system according to a related-art technique.

There is an article carrier system which follows and takes up at least one article flowing on a carrier device such as a conveyor (see, for example, Japanese Patent Application Laid-Open No. 08-063214). In such an article carrier system, an article which reaches a predetermined operation start position set in advance is detected by an image pickup apparatus or the like attached to an upper part of the carrier device or an arm of a robot, and the robot follows and grasps the detected article, and stores the grasped article into a storage container or a storage space, as shown in FIG. 9. The operation start position shown in FIG. 9 is decided by a skilled worker or the like.

In such a related-art technique as described above, however, since the robot starts to follow an article which has exceeded a position arbitrarily decided in advance first, the robot may perform a useless motion if a position away from an optimal position is incorrectly set as the position to start following. Further, there is a problem that it is difficult for an inexperienced worker to decide an optimal operation start position according to ability specific to a robot and arrangement of the robot.

SUMMARY OF THE INVENTION

Therefore, an object of the present invention is to provide a controller, a machine learning device and a machine learning method capable of deciding an optimal robot operation start condition.

A controller according to an embodiment of the present invention controls a robot for grasping at least one article placed on a carrier device and stores the article to a predetermined position and includes a machine learning device that learns an operation start condition for storing motion for the article placed on the carrier device by means of the robot. The machine learning device includes: a state observing section that observes operation start condition data showing the operation start condition and conveyance state data showing a state of the article placed on the carrier device, as state variables indicating a current state of an environment; a judgment data acquiring section that acquires judgment data showing an appropriateness judgment result of the storing motion; and a learning section that learns the operation start condition in association with the conveyance state data using the state variables and the judgment data.

The state observing section may further observe classification information that identifies a classification of the article as the state variable; and the learning section may learn the operation start condition in association with both of the conveyance state data and the classification information.

The judgment data may include at least one of a cycle time required to store a predetermined number of articles, the number of articles the robot has missed on the carrier device, torque of a motor driving the robot at the time of storing the articles by means of the robot, and vibration which occurs at the time of storing the articles by means of the robot.

The learning section may include: a reward calculating section that determines a reward related to the appropriateness judgment result; and a value function that updates section updating a function indicating value of the operation start condition for the state of the articles on the carrier device, using the reward.

The learning section may perform multi-layered calculation of the state variables and the judgment data.

The controller may further comprise a decision making section that outputs an instruction value based on the operation start condition, based on a result of learning by the learning section.

The learning section may learn the operation start condition for each of a plurality of robots, using the state variables and the judgment data obtained for each of the plurality of robots.

The machine learning device may exist in a cloud server.

A machine learning device according to an embodiment of the present invention learns an operation start condition for a storing motion for at least one article placed on a carrier device by means of a robot for grasping the at least one article placed on the carrier device and storing the article to a predetermined position. This machine learning device includes: a state observing section that observes operation start condition data showing the operation start condition and conveyance state data showing a state of the article placed on the carrier device, as state variables indicating a current state of an environment; a judgment data acquiring section that acquires judgment data showing an appropriateness judgment result of the storing motion; and a learning section that learns the operation start condition in association with the conveyance state data, using the state variables and the judgment data.

In a machine learning method according to an embodiment of the present invention, an operation start condition for a storing motion for at least one article placed on a carrier device by means of a robot is learned, the robot being for grasping the at least one article placed on the carrier device and storing the article to a predetermined position. This machine learning method includes the steps of: observing operation start condition data that shows the operation start condition and conveyance state data that shows a state of the article placed on the carrier device, as state variables indicating a current state of an environment; acquiring judgment data that shows an appropriateness judgment result of the storing motion; and learning the operation start condition in association with the conveyance state data, using the state variables and the judgment data.

According to the present invention, in comparison with a related-art scheme, a cycle time of article storing motions is minimized while a load on a robot is suppressed low, and productivity improvement can be expected. Further, by considering not only positions of articles but also types of the articles, a motion is started for an article which can be taken up more easily.

DETAILED DESCRIPTION OF THE PREFERRED EMBODIMENTS

Figure 1:
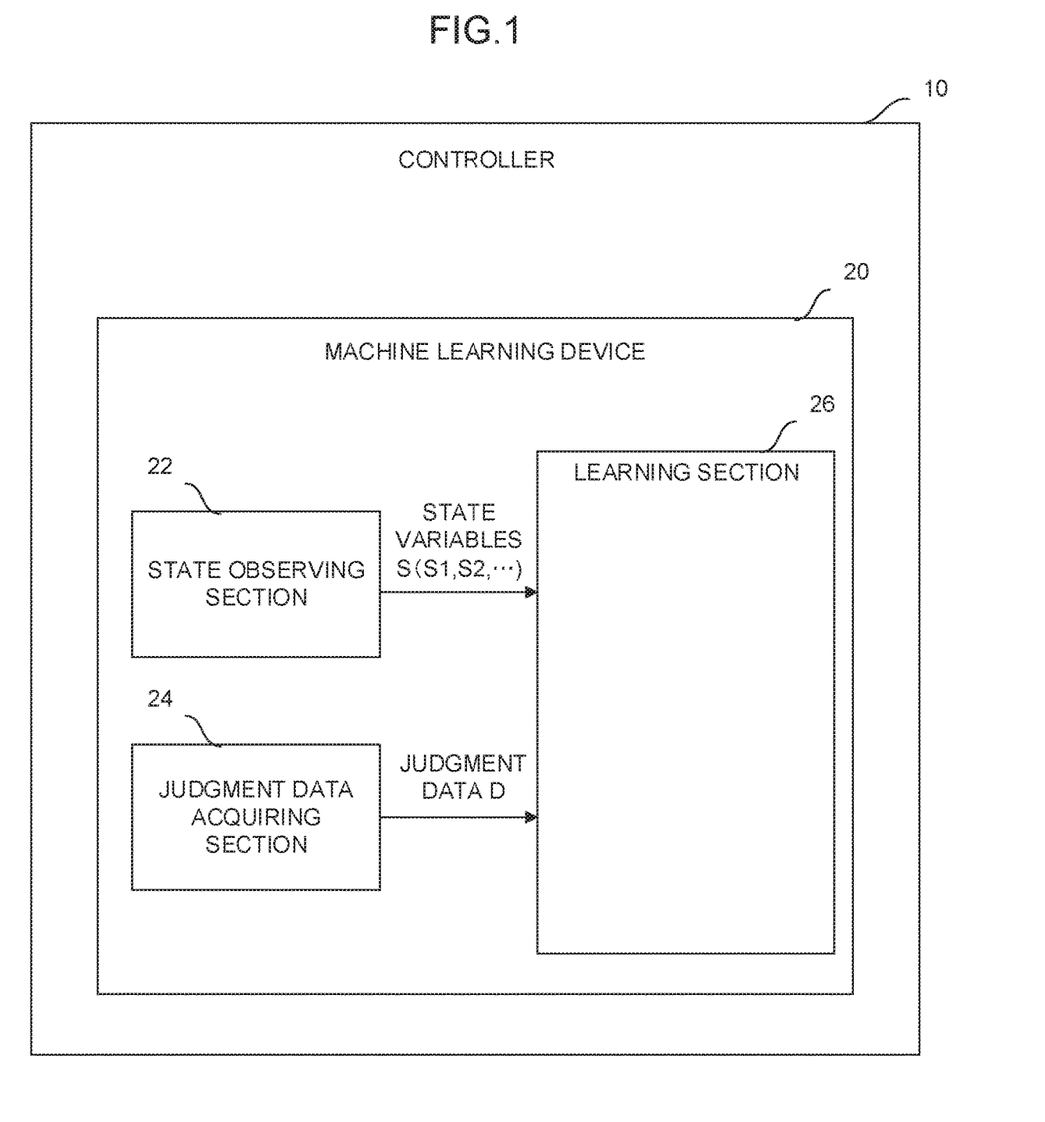
FIG. 1 is a schematic functional block diagram of a controller according to a first embodiment.

FIG. 1 is a schematic functional block diagram of a controller 10 according to a first embodiment.

The controller 10 can be implemented, for example, as a controller for controlling a robot (not shown) which follows and takes up an article flowing on a carrier device. The controller 10 is provided with a machine learning device 20 which includes software (a learning algorithm and the like) and hardware (such as a CPU of a computer) for learning an operation start condition (such as an article position on the carrier device to start an acquisition motion) by so-called machine learning itself. The operation start condition which the machine learning device 20 of the controller 10 learns corresponds to a model structure indicating correlation between information showing states of articles on the carrier device, such as positions and postures on the carrier device of the articles, and an operation start condition for the states.

As shown by functional blocks in FIG. 1, the machine learning device 20 of the controller 10 is provided with a state observing section 22 which observes operation start condition data S1 showing an operation start condition set for states of articles (not shown) flowing on the carrier device and conveyance state data S2 showing states of the articles flowing on the carrier device, as state variables S indicating a current state of an environment, a judgment data acquiring section 24 which acquires judgment data D showing an appropriateness judgment result of article storing motions by a robot under the set operation start condition, and a learning section 26 which learns the operation start condition data S1 in association with the conveyance state data S2, using the state variables S and the judgment data D.

The state observing section 22 can be configured, for example, as one function of the CPU of the computer. Otherwise, the state observing section 22 can be configured, for example, as software for causing the CPU of the computer to function. As the operation start condition data S1, among the state variables S observed by the state observing section 22, for example, operation start condition declaration data declared by a skilled worker and given to the controller 10, log data of storing motions by the robot which follows and takes up an article flowing on the carrier device, which has been acquired from the robot or a controller for the robot, or the like can be used. As the operation start condition data S1, for example, an acquisition motion operation start position or a condition for deciding order of acquiring articles on the carrier device (for example, giving priority to closeness in an x axis direction or giving priority to closeness in two-dimensional direction) or the like can be used.

Further, as the conveyance state data S2, among the state variables S, for example, a value actually measured by a first measurement device (not shown) attached to the robot or a operating parameter acquired from the robot can be used. As the conveyance state data S2, positions and postures of a predetermined number of articles flowing on a conveyor toward an operation range of the robot can be used.

The first measurement device can measure, for example, the whole or at least a predetermined area of the carrier device from a predetermined position. The first measurement device may be arranged at an upper part of the carrier device or may be attached to the arm of the robot. The first measurement device can calculate positions of articles on the carrier device, for example, based on a difference between the carrier device on which the articles are not flowing and the carrier device on which the articles are flowing. The first measurement device may be adapted to calculate shapes, colors and the like of articles on the carrier device, for example, based on a difference between the carrier device on which the articles are not flowing and the carrier device on which the articles are flowing. This calculation can be performed, for example, by the controller 10 or the state observing section 22 itself. As the first measurement device, an optical image pickup apparatus, an infrared laser, an ultrasonic measuring instrument or the like can be adopted.

The judgment data acquiring section 24 can be configured, for example, as one function of the CPU of the computer. Otherwise, the judgment data acquiring section 24 can be configured, for example, as software for causing the CPU of the computer to function. The judgment data D to be acquired by the judgment data acquiring section 24 can be acquired, for example, by using a value actually measured by the first measurement device attached to the robot or an operating parameter acquired from the robot after motions of storing an article flowing on the carrier device are performed by the robot. As the judgment data D, for example, a cycle time required to store a predetermined number of articles, the number of missed articles, torque of a motor driving the robot (which can be acquired from a current value of the motor), vibration occurring on the robot (which can be acquired by an acceleration sensor or the like attached to the robot) or the like can be used. The judgment data D is an index indicating a result of execution of article storing motions by the robot under the state variables S and indirectly indicates a state of the storing motions.

Thus, while the machine learning device 20 of the controller 10 is advancing learning, measurement of positions and postures of a predetermined number of articles on the carrier device flowing on the conveyor toward the operation range of the robot by the first measuring device, implementation of article storing work by the robot, measurement of positions of articles on the carrier device after the storing work (for measurement of the number of missed articles and the like) by the first measurement device, acquisition of data showing a state of the robot (a cycle time, torque, an amount of vibration and the like) are performed in the environment.

Figure 2:
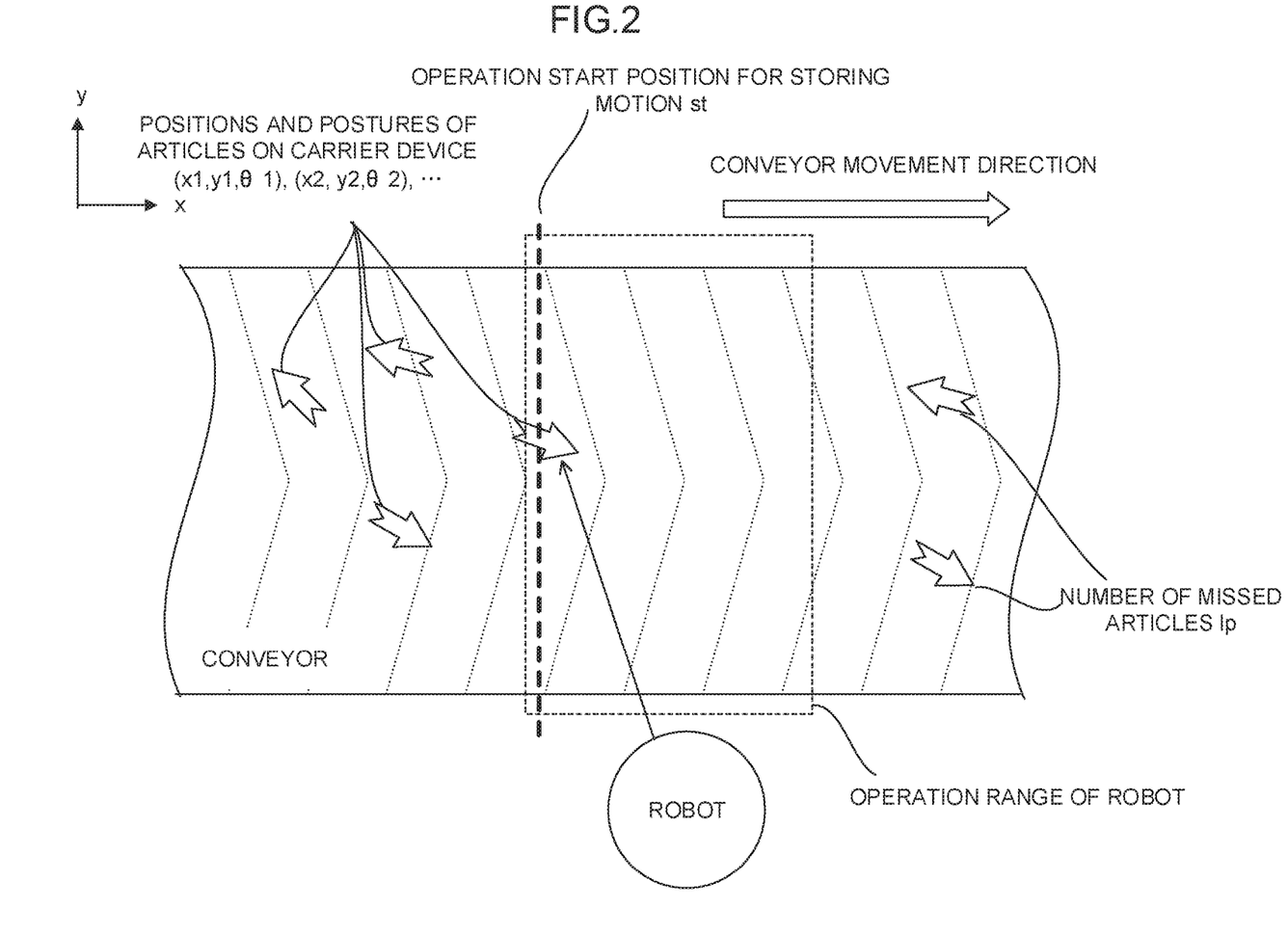
FIG. 2 is a diagram showing an example of data used for machine learning.

FIG. 2 is a diagram showing a setting example of the state variables S and the judgment data D. As illustrated in FIG. 2, for example, an x-coordinate value of an article position on the carrier device at which a storing motion is to be started can be used as an acquisition motion operation start position st included in the operation start condition data S1. Further, as positions and postures (xn, yn, θn) on the carrier device of a predetermined number of articles flowing on the carrier device toward the operation range of the robot, which is included in the conveyance state data S2, for example, an x-coordinate value and a y-coordinate value of each of the articles on the conveyor and an angle θ of each of the articles with respect to an x axis of a coordinate system can be used. Further, as the number of missed articles lp, which is included in the judgment data D, for example, the number of articles which have not been stored within the operation range of the robot within a predetermined time set in advance can be used.

The learning section 26 can be configured, for example, as one function of the CPU of the computer. Otherwise, the learning section 26 can be configured, for example, as software for causing the CPU of the computer to function. The learning section 26 learns an operation start condition for storing motions for an article on the carrier device by means of the robot, according to any of learning algorithms generically referred to as machine learning. The learning section 26 can repeatedly execute learning based on a data set which includes the state variables S and judgment data D stated before, for storing motions for a plurality of articles. While repeating the learning cycle for the storing motions for the plurality of articles, an operation start condition obtained in previous learning cycles is decided as the operation start condition data S1 between the state variables S, and the judgment data D is an appropriateness judgment result for article storing motions based on the decided operation start condition.

By repeating such a learning cycle, the learning section 26 can automatically identify characteristics suggesting correlation between states of articles on the carrier device (the conveyance state data S2) and an operation start condition for storing motions for the articles on the carrier device by means of the robot. Though the correlation between the conveyance state data S2 and the operation start conditions is substantially unknown at the time of starting the learning algorithm, the learning section 26 gradually identifies the characteristics as it advances leaning, and interprets the correlation.

When the correlation between the conveyance state data S2 and the operation start conditions is interpreted to some reliable level, learning results repeatedly outputted by the learning section 26 can be used to make a selection of an action (that is, decision making) about under which operation start condition an article storing motion is to be performed for a current state (that is, states of articles on the carrier device). That is, as the learning algorithm advances, the learning section 26 can gradually bring correlation between the states of the articles on the conveying machine and under which operation start condition an article storing motion is to be performed for the states close to an optimal solution.

As described above, in the machine learning device 20 of the controller 10, the learning section 26 leans an operation start condition at the time of storing an article placed on the carrier device by means of the robot according to the machine learning algorithm, using the state variables S observed by the state observing section 22 and the judgment data D acquired by the judgment data acquiring section 24. The state variables S are configured with such data that is less susceptible to disturbance, such as the operation start condition data S1 and the conveyance state data S2, and the judgment data D is uniquely determined by measuring states of articles on the carrier device after article storing motions or acquiring a operating parameter of the robot which is performing the storing motions. As for the conveyance state data S2, though the conveyance state data S2 depends on, for example, measurement accuracy of each machine portion as ability of the first measurement device, it is expected that the conveyance state data S2 which is highly accurate itself can be observed. Further, as for the judgment data D also, it is similarly expected that judgment data D with a high accuracy can be acquired, depending on measurement accuracy of the first measurement device. Therefore, according to the machine learning device 20 of the controller 10, it becomes possible to, by using a learning result of the learning section 26, determine an operation start condition at the time of storing an article placed on the carrier device by means of the robot, according to states of the articles not by calculation or estimation but automatically and, moreover, accurately.

If it is possible to determine an operation start condition for storing motions for an article on the carrier device by means of the robot not by calculation or estimation but automatically, it is possible to quickly decide an appropriate operation start condition at the time of storing an article placed on the carrier device by means of the robot, only by grasping states of the articles on the carrier device (the conveyance state data S2) before starting the motion of storing an article placed on the carrier device by means of the robot. Therefore, it is possible to enable the motion of storing an article placed on the carrier device by means of the robot to be performed efficiently without imposing a load on the robot.

As a modification of the machine learning device 20 of the controller 10, the state observing section 22 can further observe classification information S3 which identifies a classification of a storage target article as a state variable S. The classification information S3 can include, for example, a shape, color, weight and the like of a storage target article. The state observing section 22 can acquire the classification information S3, for example, from an output of the first measurement device. In this case, for example, the classification information S3 can be included (as a classification of a storage target article) in an operation start condition, and the learning section 26 can learn the operation start condition in association with both of the conveyance state data S2 and the classification information S3.

According to the above modification, the machine learning device 20 can learn an operation start condition in the case of causing articles of a particular classification to be targeted by a storage motion by the robot. For example, as for two kinds of articles targeted by storage, if weights and shapes (the classification information S3) of the articles are different though positions and postures (the conveyance state data S2) of the articles on the carrier device are almost the same, a situation may happen that operation start conditions at the time of storing the articles are slightly different. According to the configuration described above, it is possible to, even in such a situation, optimize the operation start conditions at the time of storing the storage target articles according to the weights, shapes and the like (the classification information S3) of the articles. Further, there may be a case where correlation between positions and postures of storage target articles on the carrier device (the conveyance state data S2) and classifications of the articles (the classification information S3) can be found as learning is advanced. In this case, it becomes possible to estimate the conveyance state data S2 from the classification information S3 to some extent. Therefore, even if accuracy of measurement of states of articles on the carrier device by the first measurement device is low, it is possible to appropriately converge learning and optimize an operation start condition at the time of storing an article.

As another modification of the machine learning device 20 of the controller 10, the learning section 26 can learn, by using state variables S and judgment data D obtained for each of a plurality of robots having the same configuration, operation start conditions for storing motions for an article on the carrier device by means of the robots. According to this configuration, since it is possible to increase a size of the data set which includes state variables S and judgment data D obtained in a predetermined time period, it is possible to improve speed and reliability of learning of the operation start conditions for the storing motions for an article on the carrier device by means of the robots with a set of more various data as an input.

Figure 3:
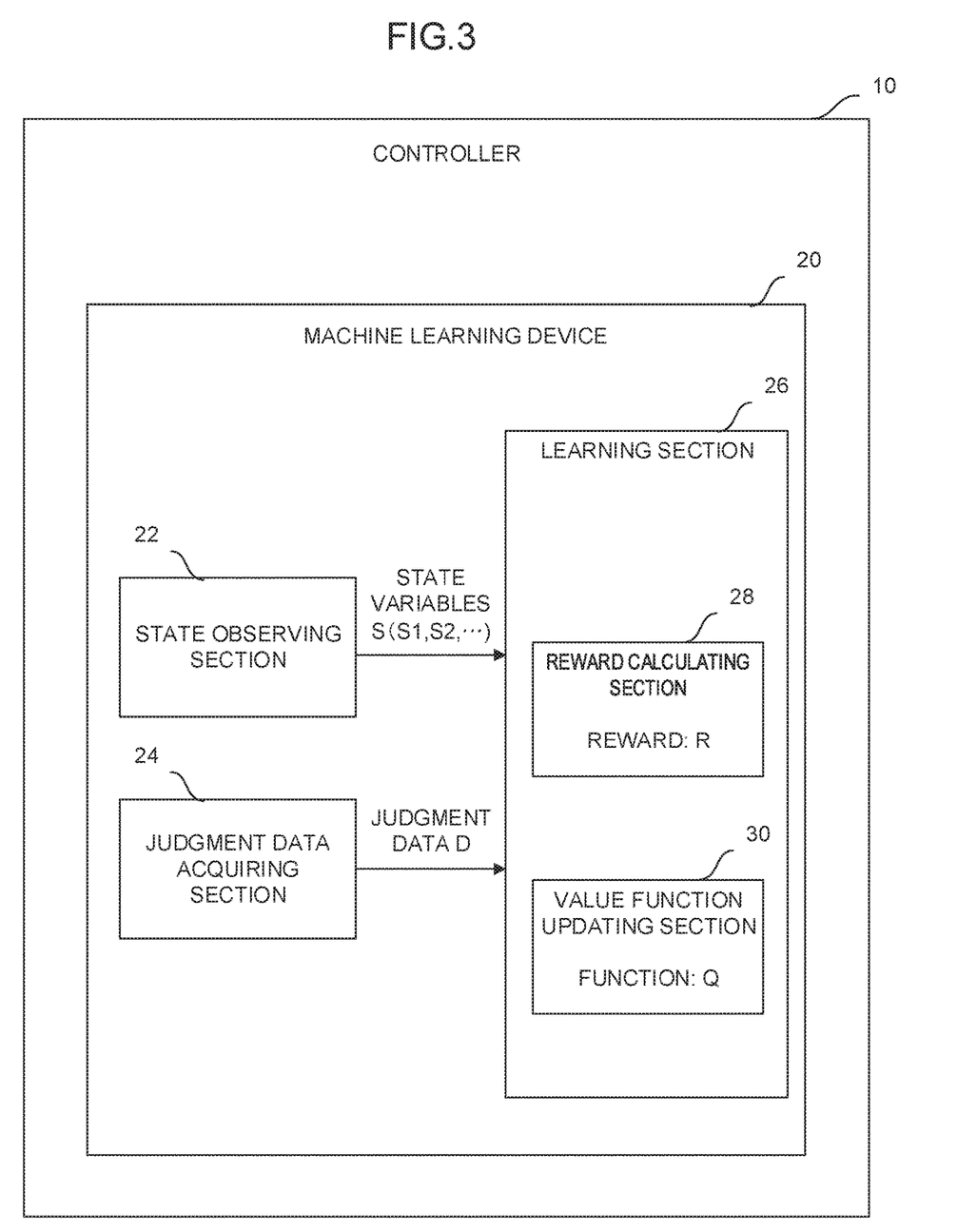
FIG. 3 is a schematic functional block diagram showing a form of the controller.

In the machine learning device 20 having the above configuration, the learning algorithm executed by the learning section 26 is not especially limited, and a learning algorithm which is well known as machine learning can be adopted. FIG. 3 shows a form of the controller 10 shown in FIG. 1, which is a configuration provided with the learning section 26 which executes reinforcement learning as an example of the learning algorithm. The reinforcement learning is a method in which a cycle of observing a current state (that is, an input) of an environment in which a learning target exists, executing a predetermined action (that is, an output) in the current state and giving some reward to the action is repeated by trial and error; and such a scheme (in the machine learning device of the present application, an operation start condition for motions of storing an article placed on the carrier device by a robot) that a total of rewards is maximized is learned as an optimal solution.

In the machine learning device 20 of the controller 10 shown in FIG. 3, the learning section 26 is provided with a reward calculating section 28 which determines a reward R related to an appropriateness judgment result (corresponding to judgment data D used in the next learning cycle) of storing motions for an article on the carrier device by means of the robot, based on state variables S, and a value function updating section 30 which updates a function Q indicating value of an operation start condition for storing motions for an article on the carrier device by means of the robot using the determined reward R. By the value function updating section 30 repeating update of the function Q, the learning section 26 learns the operation start condition for storing motions for an article on the carrier device by means of the robot, for states of articles on the carrier device.

An example of the reinforcement learning algorithm executed by the learning section 26 will be described. The algorithm of this example is known as Q-learning and is a method for, when a state s of an action entity and an action a which can be selected by the action entity in the state s are independent variables, learning a function Q (s, a) indicating an action value in the case of selecting an action a in a state s. By selecting such an action a that the value function Q is the highest in a state s, an optimal solution is obtained. By starting Q-learning in a state that correlation between a state s and an action a is unknown and repeating trial and error of selecting various actions a in an arbitrary state s, the value function Q is repeatedly updated and brought close to the optimal solution. Here, by making a configuration so that, when an environment (that is, a state s) changes as a result of an action a being selected in a state s, a reward (that is, weighting of the action a) r according to the change is obtained, and guiding learning so that such an action a that a higher reward r can be obtained is selected, it is possible to bring the value function Q close to the optimal solution in a relatively short time.

A formula to update the value function Q can be generally expressed by Formula (1) shown below. In Formula (1), $s_t$ and $a_t$ are a state and an action, respectively, at time t, and the state changes to $s_{t+1}$ by an action $a_t$. Here, $r_{t+1}$ indicates a reward obtained by the state having changed from $s_t$ to $s_{t+1}$. A term of 'maxQ' means Q at the time when an action a, which is considered at time t that the maximum value Q will be achieved at time t+1, is taken. Further, α and γ are a learning coefficient and a discount rate, respectively, and they are arbitrarily set within ranges of "0<α≤1" and "0<γ≤1", respectively.

$$Q(s_t,a_t) \leftarrow Q(s_t,a_t) + \alpha(r_{t+1} + \gamma \max_a Q(s_{t+1},a) - Q(s_t,a_t)) \quad (1)$$

When the learning section 26 executes Q-learning, state variables S observed by the state observing section 22 and judgment data D acquired by the judgment data acquiring section 24 correspond to the state s in the update formula (Formula (1) above); an action as to how an operation start condition for storing motions for an article on the carrier device by means of the robot for a current state (that is, a state of articles on the carrier device) should be changed corresponds to the action a in the update formula; and a reward R determined by the reward calculating section 28 corresponds to the reward r in the update formula. Therefore, the value function updating section 30 repeatedly updates the function Q indicating value of an operation start condition for storing motions for an article on the carrier device by means of the robot for a current state by Q-learning using the reward R.

As for the reward R determined by the reward calculating section 28, for example, when, after an operation start condition for storing motions for an article on the carrier device by means of the robot is decided, the storing motions for an article on the carrier device by means of the robot is performed based on the operation start condition, the reward R can be:

a positive (plus) reward R if a storing motion state is judged to be "appropriate" (for example, in a case where a cycle time of storing motions for a predetermined number of articles is within an allowable range, in a case where the number of missed articles is within an allowable range, in a case where torque of the motor which drives the robot is within an allowable range, in a case where an amount of vibration of the robot is within an allowable range, and the like); and, on the other hand, a negative (minus) reward R if the storing motion state is judged to be "inappropriate" (for example, in a case where the cycle time of the storing motions for the predetermined number of articles is outside the allowable range, in a case where the number of missed articles is outside the allowable range, in a case where the torque of the motor which drives the robot is outside the allowable range; in a case where the amount of vibration of the robot is outside the allowable range, and the like).

Absolute values of the positive and negative rewards R may be mutually the same or different. Further, the judgment may be performed by combining a plurality of values included in the judgment data D as a condition for the judgment.

Further, an appropriateness judgment result of a state of storing motions for an article on the carrier device by means of the robot can be set not only to two kinds of "appropriate"

and "inappropriate" but also to a plurality of stages. As an example, a configuration can be made in which, when a maximum value of an allowable range of an article storing motion cycle time is $T_{max}$, a reward "R=5" is given if a cycle time t of the article storing motion satisfies "$0 \leq T < T_{max}/5$", a reward "R=2" is given if the cycle time t of the article storing motion satisfies "$T_{max}/5 \leq T < T_{max}/2$", and a reward "R=1" is given if the cycle time t of the article storing motion satisfies "$T_{max}/2 \leq T \leq T_{max}$". Furthermore, it is also possible to set $T_{max}$ relatively large at an initial stage of learning and reduce $T_{max}$ as the learning advances.

The value function updating section 30 can have an action value table in which the state variables S, the judgment data D and the rewards R are arranged in association with action values (for example, numerical values) indicated by the function Q. In this case, a behavior of the value function updating section 30 updating the function Q has the same meaning as a behavior of the value function updating section 30 updating the action value table. Since correlation between a current state of an environment and an operation start condition for storing motions for an article on the carrier device by means of the robot is unknown when Q-learning is started, various state variables S, pieces of judgment data D and rewards R are prepared in association with randomly specified values of action value (the function Q) in the action value table. If judgment data D is known, the reward calculating section 28 can immediately calculate a reward R corresponding to the judgment data D, and the calculated value R is written into the action value table.

When Q-learning is advanced with the use of a reward R corresponding to an appropriateness judgment result of a state of storing motions for an article on the carrier device by means of the robot, the learning is guided such that an action that can obtain a higher reward R is selected. Then, a value of action value (the function Q) about an action to be performed in a current state is rewritten according to a state of an environment (that is, the state variables S and the judgment data D) which changes as a result of executing a selected action in the current state, and the action value table is updated. By repeating the update, the values of action value (the function Q) displayed in the action value table are rewritten so that a larger value is given to a more appropriate action. In this way, the correlation between the current state of the environment (states of articles on the carrier device) and an action for the state (an operation start condition for storing motions for an article on the carrier device by means of the robot) which has been unknown gradually becomes apparent. That is, by updating the action value table, a relationship between the states of articles on the carrier device and the operation start condition for storing motions for an article on the carrier device by means of the robot is gradually brought close to an optimal solution.

Figure 4:
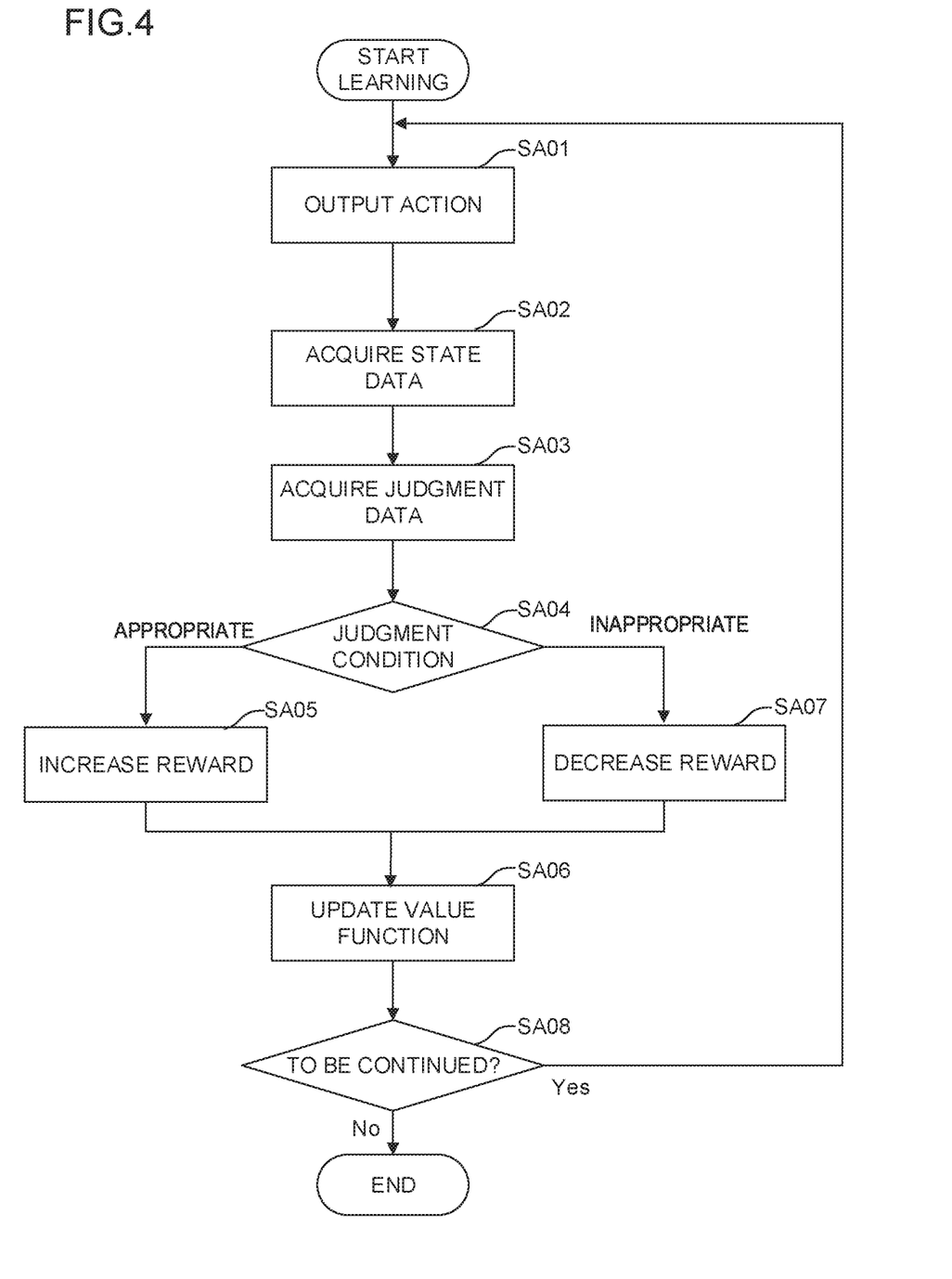
FIG. 4 is a schematic flowchart showing a form of a machine learning method.

A flow of the above Q-learning executed by the learning section 26 (that is, a form of a machine learning method) will be furthermore described with reference to FIG. 4.

First, at step SA01, the value function updating section 30 randomly selects an operation start condition for storing motions for an article on the carrier device by means of the robot as an action to be performed in a current state indicated by state variables S observed by the state observing section 22, referring to the action value table at that time point. Next, the value function updating section 30 takes in state variables S of the current state observed by the state observing section 22 at step SA02 and takes in judgment data D of the current state acquired by the judgment data acquiring section 24 at step SA03.

Next, the value function updating section 30 judges whether the operation start condition for the storing motions for an article on the carrier device by means of the robot is appropriate or not based on the judgment data D at step SA04. If the operation start condition is appropriate, the value function updating section 30 applies a positive reward R determined by the reward calculating section 28 to the formula to update the function Q at step SA05 and, then, updates the action value table using the state variables S, the judgment data D, the reward R and a value of action value (the updated function Q) for the current state at step SA06. On the other hand, if judging that the operation start condition for the storing motions for an article on the carrier device by means of the robot is not appropriate at step SA04, the value function updating section 30 applies a negative reward R determined by the reward calculating section 28 to the formula to update the function Q at step SA07 and, then, updates the action value table using the state variables S, the judgment data D, the reward R and a value of action value (the updated function Q) for the current state at step SA06.

The learning section 26 repeatedly updates the action value table by repeating processing in steps SA01 to SA07 and advances learning of the operation start condition for storing motions for an article on the carrier device by means of the robot.

Figure 5A:
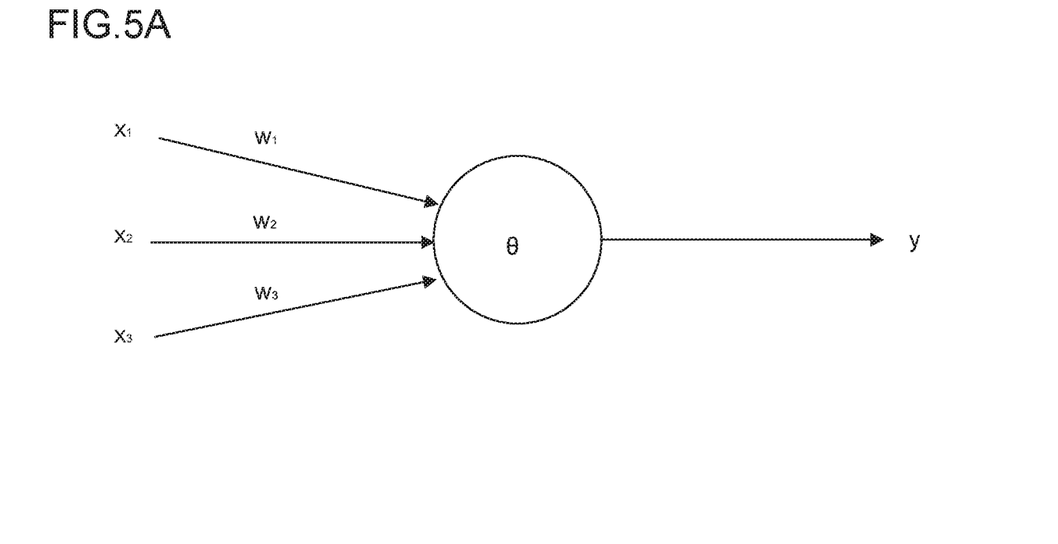
FIG. 5A is a diagram illustrating a neuron.
Figure 5B:
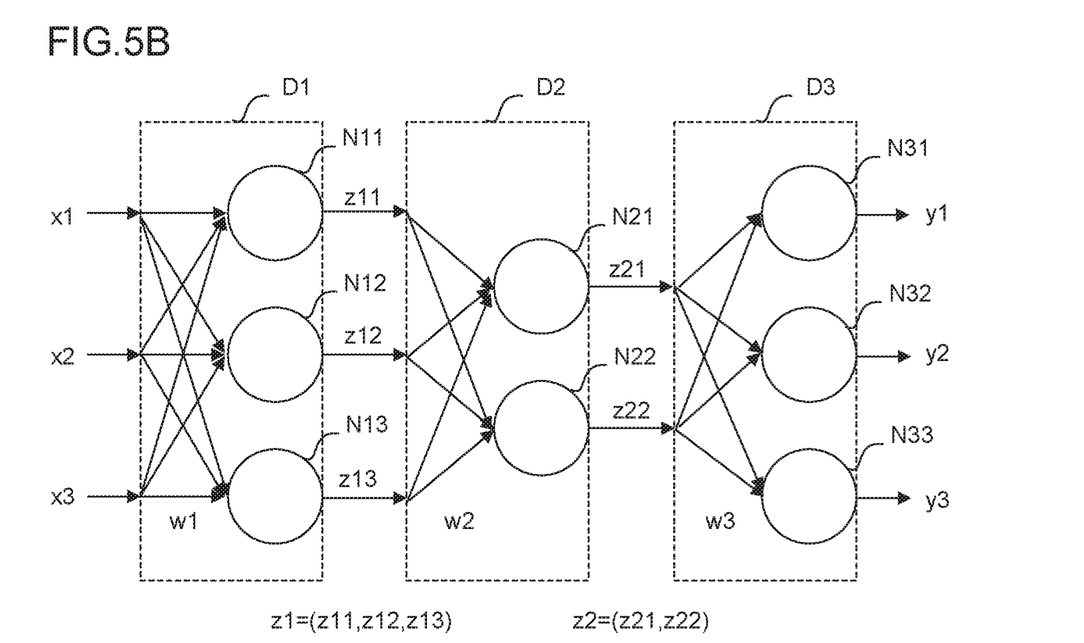
FIG. 5B is a diagram illustrating a neural network.

At the time of advancing the reinforcement learning stated before, for example, a neural network can be used instead of the Q-learning. FIG. 5A schematically shows a model of a neuron. FIG. 5B schematically shows a model of a three-layer neural network configured by combining the neurons shown in FIG. 5A. The neural network can be configured, for example, with arithmetic units, storage devices and the like simulating neuron models.

The neuron shown in FIG. 5A outputs a result y for a plurality of inputs x (here, inputs $x_1$ to $x_3$ as an example). Weights w ($w_1$ to $w_3$) corresponding to the inputs x are applied to the inputs $x_1$ to $x_3$, respectively. Thereby, the neuron outputs an output y expressed by Formula (2) below. In Formula (2), all of the inputs x, the output y and the weights w are vectors. Further, $\theta$ indicates a bias, and $f_k$ indicates an activation function.

$$y = f_k(\Sigma_{i=1}^n x_i w_i - \theta) \tag{2}$$

In the three-layer neural network shown in FIG. 5B, a plurality of inputs x (here, inputs x1 to x3, as an example) are inputted from a left side, and results y (here, outputs y1 to y3 as an example) are outputted from a right side. In the example shown in FIG. 5B, the inputs x1, x2 and x3 are multiplied by corresponding weights (collectively indicated by w1) and each of the inputs x1, x2 and x3 is inputted to three neurons N11, N12 and N13.

In FIG. 5B, outputs of the neurons N11 to N13 are collectively indicated by z1. Here, z1 can be regarded as feature vectors obtained by extracting feature quantities of input vectors. In the example shown in FIG. 5B, the feature vectors z1 are multiplied by corresponding weights (collectively indicated by w2) and each of the feature vectors z1 is inputted to two neurons N21 and N22. The feature vectors z1 indicate features between the weights w1 and the weights w2.

In FIG. 5B, outputs of the neurons N21 and N22 are collectively indicated by z2. Here, z2 can be regarded as feature vectors obtained by extracting feature quantities of the feature vectors z1. In the example shown in FIG. 5B, the feature vectors z2 are multiplied by corresponding weights (collectively indicated by w3) and each of the feature vectors z2 is inputted to three neurons N31, N32 and N33.

The feature vectors z2 indicate features between the weights w2 and the weights w3. Lastly, the neurons N31 to N33 output results y1 to y3, respectively.

In the machine learning device 20 of the controller 10, by the learning section 26 performing multi-layered calculation according to the neural network described above, with state variables S and judgment data D as the inputs x, an operation start condition (results y) for the storing motion for an article on the carrier device by means of the robot can be outputted. Operation modes of the neural network include a learning mode and a value estimation mode. For example, it is possible to learn weight w using a learning data set in the learning mode and make a judgment about value of an action using the learned weight w in the value estimation mode. In the value estimation mode, detection, classification, reasoning and the like can be also performed.

The configuration of the controller 10 described above can be described as a machine learning method (or software) executed by the CPU of the computer. The machine learning method is a method for learning an operation start condition for storing motion for an article on the carrier device by means of the robot, and include the steps of: observing operation start condition data S1 showing the operation start condition for storing motions for an article on the carrier device by means of the robot and conveyance state data S2 showing states of articles on the carrier device, as state variables S indicating a current state of an environment in which storing motion for an article on the carrier device by means of the robot is performed; acquiring judgment data D showing an appropriateness judgment result of the state of storing motions for an article on the carrier device by means of the robot; and learning the operation start condition for storing motions for an article on the carrier device by means of the robot in association with the conveyance state data S2, using the state variables S and the judgment data D.

Figure 6:
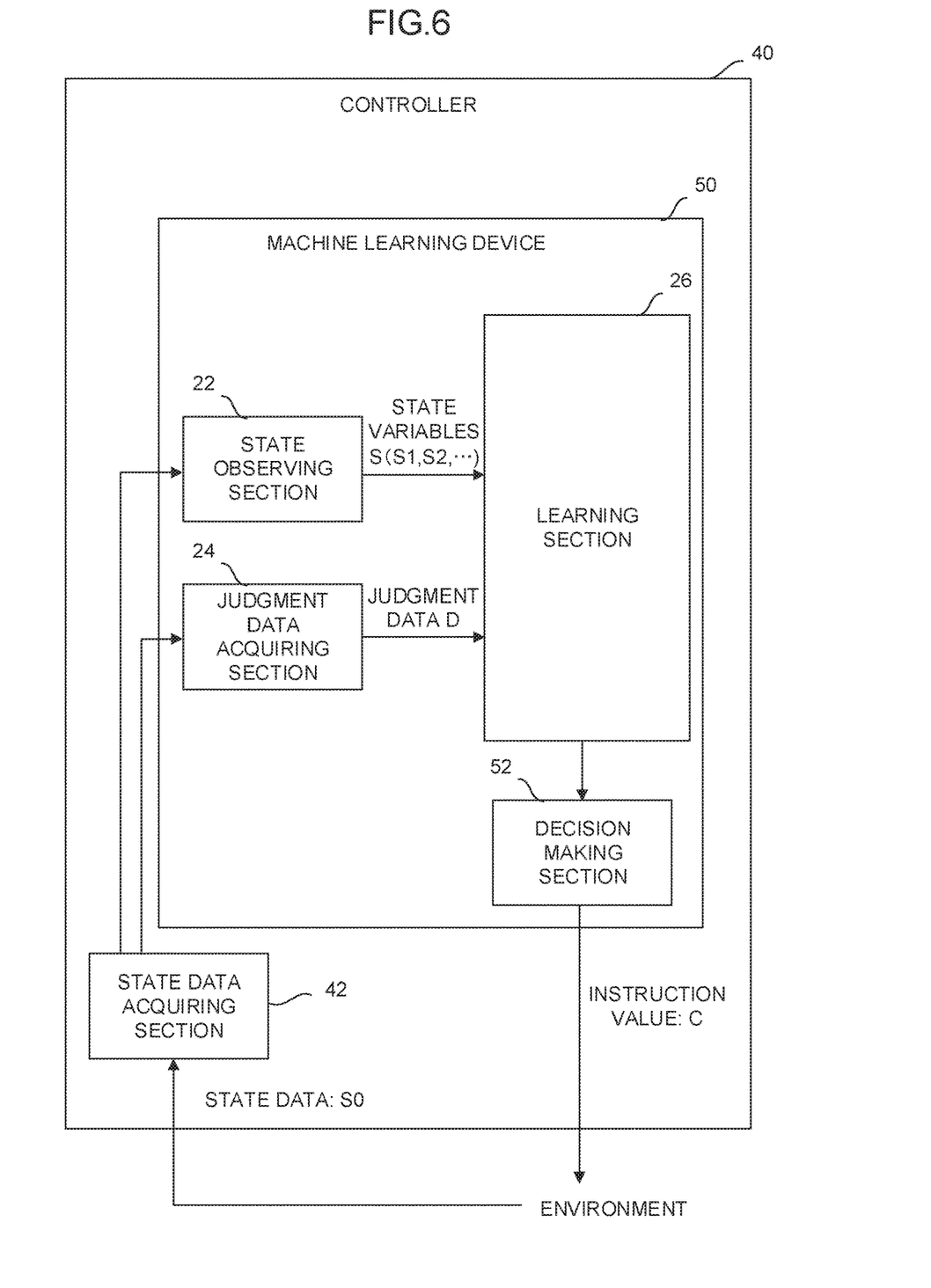
FIG. 6 is a schematic functional block diagram of a controller according to a second embodiment.

FIG. 6 shows a controller 40 according to a second embodiment.

The controller 40 is provided with a machine learning device 50 and a state data acquiring section 42 which acquires the operation start condition data S1 and the conveyance state data S2 of the state variables S observed by the state observing section 22 as state data S0. The state data S0 acquired by the state data acquiring section 42 can also include the classification information S3. The state data acquiring section 42 can acquire the state data S0 from the aforementioned first measurement device attached to a machine or an appropriate data input by a worker.

The machine learning device 50 of the controller 40 includes, in addition to the software (the learning algorithm and the like) and the hardware (such as a CPU of a computer) for learning an operation start condition for storing motions for an article on the carrier device by means of the robot by machine learning itself, software (an arithmetic algorithm and the like) and hardware (a CPU of the computer) for outputting the learned operation start condition for storing motions for an article on the carrier device by means of the robot as an instruction to the robot (not shown). The machine learning device 50 included in the controller 40 can have a configuration in which one common CPU executes all pieces of software including the learning algorithm, the arithmetic algorithm and the like.

A decision making section 52 can be configured, for example, as one function of the CPU of the computer. Otherwise, the decision making section 52 can be configured, for example, as software for causing the CPU of the computer to function. The decision making section 52 generates an instruction value C to the robot which performs a storing motion, based on an operation start condition for storing motions for an article on the carrier device by means of the robot which has been learned by the learning section 26, and outputs the generated instruction value C. When the decision making section 52 outputs the instruction value C based on the operation start condition for storing motions for an article on the carrier device by means of the robot to the robot, a state of an environment (the operation start condition data S1) changes accordingly.

The state observing section 22 observes the state variables S including the operation start condition data S1, which has changed after display or output of the operation start condition for storing motions for an article on the carrier device by means of the robot to the environment by the decision making section 52, in the next learning cycle. The learning section 26 learns the operation start condition for storing motions for an article on the carrier device by means of the robot, for example, by updating the value function Q (that is, the action value table) using the state variables S which have changed. Under the learned operation start condition for storing motions for an article on the carrier device by means of the robot, the decision making section 52 outputs, to the robot, the instruction value C based on the operation start condition for storing motions for an article on the carrier device by means of the robot, according to the state variables S. By repeating this cycle, the machine learning device 50 advances learning of the operation start condition for storing motions for an article on the carrier device by means of the robot, and gradually improves reliability of the operation start condition for storing motions for an article on the carrier device by means of the robot, which the machine learning device 50 itself decides.

The machine learning device 50 of the controller 40 having the above configuration has an advantageous effect equal to that of the machine learning device 20 described before. Especially, the machine learning device 50 can cause a state of an environment to change by means of output of the decision making section 52. On the other hand, the machine learning device 20 can request a function corresponding to the decision making section 52, which is for reflecting a learning result of the learning section 26 to an environment, from an external apparatus (for example, the controller for the robot).

Figure 7:
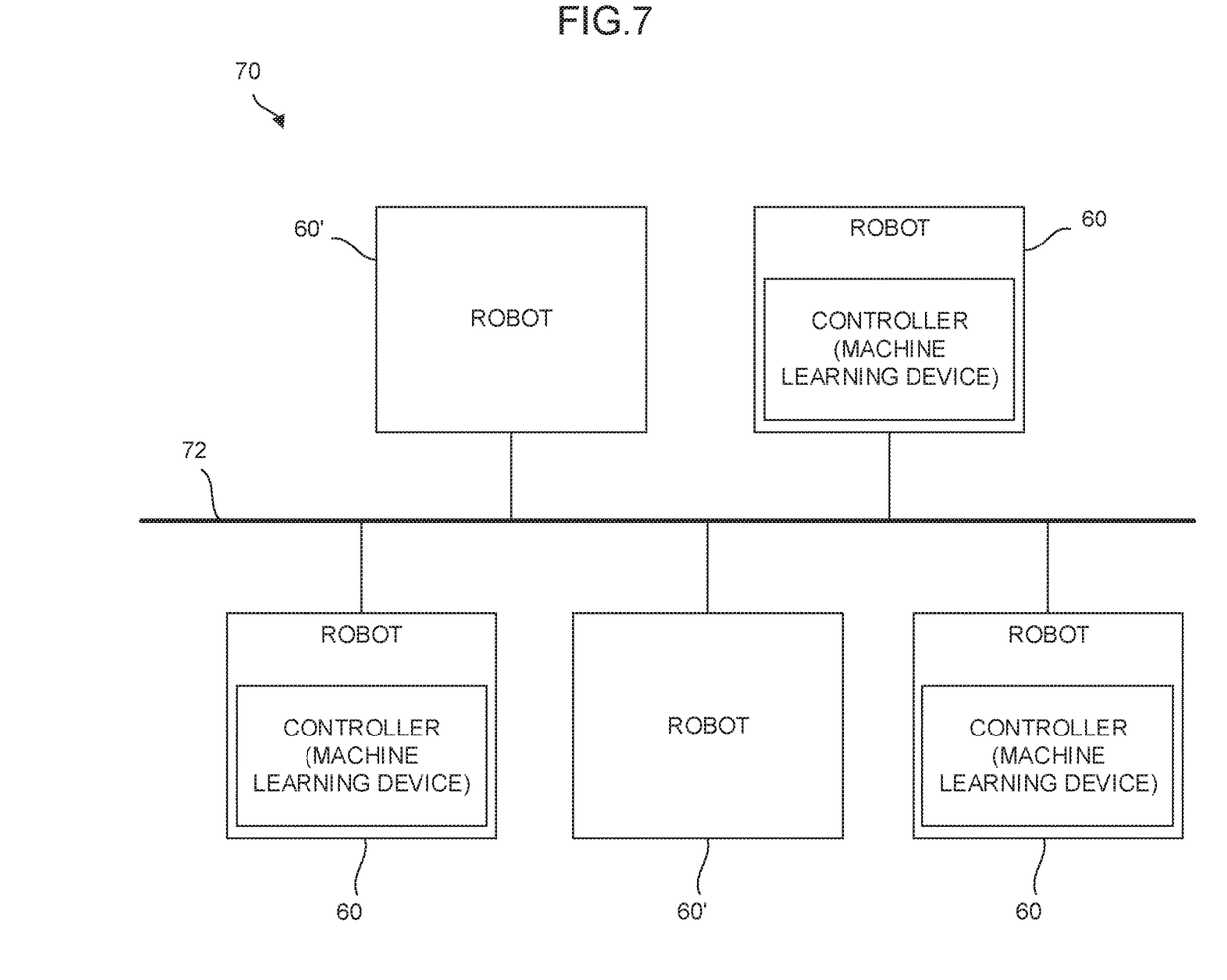
FIG. 7 is a schematic functional block diagram showing a form of an article carrier system.

FIG. 7 shows an article carrier system 70 provided with robots 60, according to an embodiment.

The article carrier system 70 is provided with a plurality of robots 60 and 60' having the same machine configuration, and a network 72 connecting the robots 60 and 60' to one another. At least one of the plurality of robots 60 and 60' is configured as a robot 60 provided with the controller 40 described above. Further, the article carrier system 70 can include robots 60' which are not provided with the controller 40. The robots 60 and 60' have a general configuration required to store articles on the carrier device.

In the article carrier system 70 having the above configuration, the robot 60 provided with the controller 40 among the plurality of robots 60 and 60' can determine an operation start condition for storing motions for an article on the carrier device by means of the robot, corresponding to states of articles on the carrier device not by calculation or estimation but automatically and, moreover, accurately, using a learning result of the learning section 26. Further, a configuration can be made in which the controller 40 of the at least one robot 60 learns an operation start condition for storing motions for an article on the carrier device by means of the robot, which is common to all the robots 60 and 60', based on state variables S and judgment data D obtained for each of the other plurality of robots 60 and 60', and all the robots 60 and 60' share a result of the learning. Therefore, according to the article carrier system 70, it is possible to improve speed and reliability of learning of an operation start condition for storing motions for an article on the carrier device by means of the robots, with a set of more various data (including the state variables S and the judgment data D) as an input.

Figure 8:
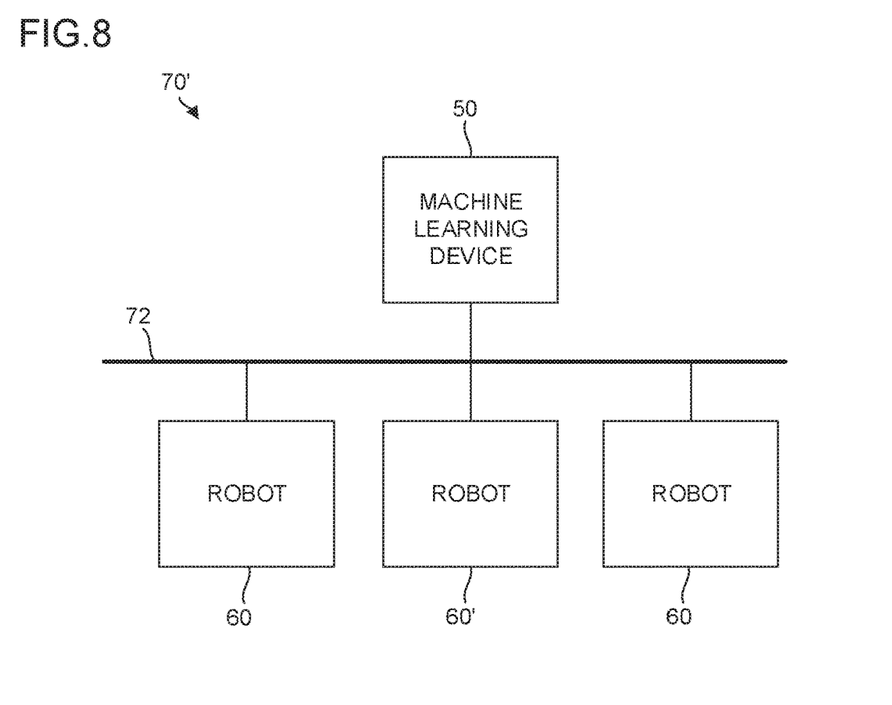
FIG. 8 is a schematic functional block diagram showing another form of the article carrier system.

FIG. 8 shows an article carrier system 70' provided with robots 60', according to another embodiment.

The article carrier system 70' is provided with the machine learning device 50 (or 20), a plurality of robots 60' having the same machine configuration, a network 72 connecting the robots 60' and the machine learning device 50 (or 20) to one another.

In the article carrier system 70' having the above configuration, the machine learning device 50 (or 20) can learn an operation start condition for storing motions for an article on the carrier device by means of the robots, which is common to all the robots 60', based on state variables S and judgment data D obtained for each of the plurality of robots 60' and determine an operation start condition for storing motions for an article on the carrier device by means of the robots, according to states of articles placed on the carrier device not by calculation or estimation but automatically and, moreover, accurately, using a result of the learning.

The article carrier system 70' can have a configuration in which the machine learning device 50 (or 20) exists in a cloud server, a cell controller or the like prepared on the network 72. According to this configuration, it is possible to connect a necessary number of robots 60' to the machine learning device 50 (or 20) when necessary, irrespective of a place or a period in which each of the plurality of robots 60' exists.

A worker engaged in the article carrier system 70 or 70' can execute judgment about whether a degree of achievement of learning of the operation start condition for storing motions for an article on the carrier device by means of the robots by the machine learning device 50 (or 20) (that is, reliability of the operation start condition for storing motions for an article on the carrier device by means of the robots) has reached a requested level or not at an appropriate timing after start of the learning by the machine learning device 50 (or 20).

Embodiments of the present invention have been described above. The present invention, however, is not limited to the examples of the embodiments described above and can be implemented in various aspects by making an appropriate change.

For example, the learning algorithm executed by the machine learning device 20 or 50, the arithmetic algorithm executed by the machine learning device 50, the control algorithm executed by the controller 10 or 40, and the like are not limited to those described above, and various algorithms can be adopted.

Further, though an example in which the machine learning device 20 or 50 performs machine learning online on the controller 10 or 40 in the embodiments described above, it is also possible to record the state data S and the judgment data D as log data at the time of controlling a robot by the controller 10 or the controller 40 and collect the recorded log data so that the machine learning device 20 or 50 performs machine learning based on the state data S and judgment data D acquired from the collected log data.

What is claimed is:

1. A controller configured to control a robot for grasping at least one article placed on an operating carrier device and store the grasped article to a predetermined position, the controller comprising:
   a processor configured to learn an operation start condition for storing motion for the article placed on the operating carrier device by means of the robot for grasping the article placed on the operating carrier device and storing the article to a predetermined position, wherein
   the processor is configured to:
   acquire, as state variables indicating a current state of an environment, (i) operation start condition data showing the operation start condition and (ii) conveyance state data showing a state of the article placed on the operating carrier device,
   acquire judgment data showing an appropriateness judgment result of the storing motion, and
   learn the operation start condition in association with the conveyance state data, using the state variables and the judgment data,
   wherein the judgment data comprises a number of missed articles, torque of a motor driving the robot, or vibration occurring on the robot.

2. The controller according to claim 1, wherein
   the processor is configured to observe classification information that identifies a classification of the article as the state variables; and
   the processor is configured to learn the operation start condition in association with both of the conveyance state data and the classification information.

3. The controller according to claim 1, wherein the judgment data comprises at least one of a cycle time required to store a predetermined number of articles, the number of articles the robot has missed on the operating carrier device, torque of a motor driving the robot at the time of storing the articles by means of the robot, and vibration which occurs at the time of storing the articles by means of the robot.

4. The controller according to claim 1, wherein
   the processor is configured to:
   determine a reward related to the appropriateness judgment result; and
   update a function indicating value of the operation start condition for the state of the article placed on the operating carrier device, using the reward.

5. The controller according to claim 1, wherein the processor is configured to perform multi-layered calculation of the state variables and the judgment data.

6. The controller according to claim 1, wherein the processor is configured to output an instruction value based on the operation start condition in association with the conveyance state data.

7. The controller according to claim 1, wherein the processor is configured to learn the operation start condition for each of a plurality of robots, using the state variables and the judgment data obtained for each of the plurality of robots.

8. A processor configured to learn an operation start condition for a storing motion for at least one article placed on an operating carrier device by means of a robot for grasping the at least one article placed on the operating carrier device and storing the article to a predetermined position, the processor is configured to:
   acquire, as state variables indicating a current state of an environment, (i) operation start condition data showing the operation start condition and (ii) conveyance state data showing a state of the article placed on the operating carrier device,
acquire judgment data showing an appropriateness judgment result of the storing motion, and
learn the operation start condition in association with the conveyance state data, using the state variables and the judgment data,
wherein the judgment data comprises a number of missed articles, torque of a motor driving the robot, or vibration occurring on the robot.

9. A machine learning method for learning an operation start condition for a storing motion for at least one article placed on an operating carrier device by means of a robot for grasping the at least one article placed on the operating carrier device and storing the article to a predetermined position, the machine learning method comprising the steps of:
observing operation start condition data that shows the operation start condition and conveyance state data that shows a state of the article placed on the operating carrier device, as state variables indicating a current state of an environment;
acquiring judgment data that shows an appropriateness judgment result of the storing motion; and
learning the operation start condition in association with the conveyance state data, using the state variables and the judgment data.

* * * * *